(No Model.)
I. HOGELAND.
CAR WHEEL.
No. 398,325. Patented Feb. 19, 1889.
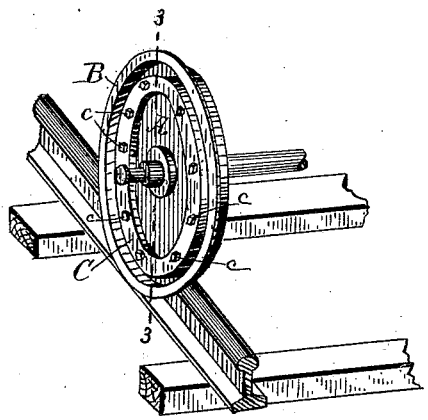
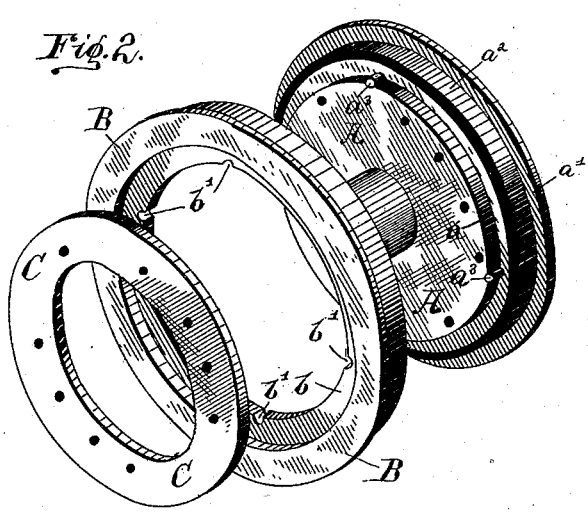
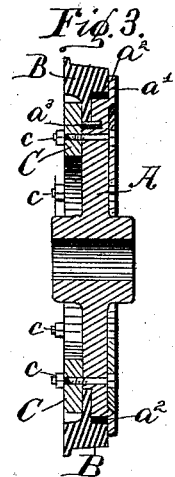
WITNESSES.
C. W. H. Brown,
T. H. Wood,
INVENTOR.
Israel Hogeland,
Per E. W. Bradford,
ATTORNEYS.

UNITED STATES PATENT OFFICE.

ISRAEL HOGELAND, OF INDIANAPOLIS, INDIANA.

CAR-WHEEL.

SPECIFICATION forming part of Letters Patent No. 398,325, dated February 19, 1889

Application filed August 2, 1888. Serial No. 281,721. (No model.)

*To all whom it may concern:*

Be it known that I, ISRAEL HOGELAND, a citizen of the United States, residing at Indianapolis, in the county of Marion and State of Indiana, have invented certain new and useful Improvements in Car-Wheels, of which the following is a specification.

My said invention consists in an improved construction of a car-wheel possessed of some elasticity in a vertical direction, whereby a very strong and durable wheel of this character is provided, as will be hereinafter more fully described and claimed.

Referring to the accompanying drawings, which are made a part hereof, and on which similar letters of reference indicate similar parts, Figure 1 is a perspective view of a car-wheel constructed in accordance with my invention; Fig. 2, a perspective view of the same with its parts dissembled, and Fig. 3 a central vertical section on the dotted line 3 3 in Fig. 1.

In said drawings, the portions marked A represent the body of the wheel, B the tire, and C an annular plate for covering the joint in the face of the wheel.

The body A of the wheel is formed with a shoulder, $a$, adapted to fit within the tire, and has an annular flange, $a'$, extending out from its rear side, adapted to fit against the back side of said tire. On its periphery is mounted a packing-ring, $a^3$, of some suitable elastic material—such as rubber, gutta-percha, asbestus, cloth, &c.—which is of sufficient thickness to fill the space between said body and said tire, the body being formed somewhat smaller than said tire to allow of this arrangement.

The tire B is in most particulars of the usual form, being of a size to fit onto the body of the wheel. It is provided with an inwardly-extending annular flange, $b$, formed near its outside face and arranged to rest against the face of the body A between the shoulder $a$ and its periphery, the space between the edge of said flange and said shoulder being only sufficient to allow of such motion of the two parts in relation to each other as may be desired. It is also provided with notches $b'$, arranged to receive shoulders or pins $a^3$, formed on or secured at the shoulder $a$ of the body, thus securing said parts from turning independently.

The annular plate C is formed to cover the joint on the front side of the wheel between its body and the tire. It is provided with numerous perforations arranged to register with similar perforations in the body A just below the shoulder $a$, and said parts are secured together and rigidly clamped upon the flange $b$ of the tire by means of the bolts $c$, extending through said perforations, as shown.

By this construction the several parts are firmly and durably secured together, and as the wheels pass over the joints between the rails and other uneven surfaces in the track the jar which would naturally result is taken up by the elastic packing-rings and not communicated to the coach above, and a very large per cent. of the usual jolting and noise of the moving coach and the cause of its wearing out is thus obviated. A further advantage of this construction, and one of no small importance, is the great lessening of the usual wear and tear upon the track, thus prolonging its durability and life. By the particular arrangement of parts the old tire may be removed and a new one substituted whenever necessary without destroying the body of the wheel, thus still further contributing in no small degree to economy in the repair of the rolling-stock.

Having thus fully described my said invention, what I claim as new, and desire to secure by Letters Patent, is—

In a car-wheel, the combination of the body A, formed with the shoulder $a$, having pins or projections around its periphery, and an annular flange, $a'$, extending out from its edge, the tire B, having an inwardly-extending annular flange, $b'$, provided with notches to receive the pins or projections around the shoulder $a$ of the body, the ring of packing material interposed between said two parts, the ring C, arranged over the joint between said two parts, and the bolts $c$, for securing them together, substantially as set forth.

In witness whereof I have hereunto set my hand and seal, at Indianapolis, Indiana, this 18th day of July, A. D. 1888.

ISRAEL HOGELAND. [L. S.]

Witnesses:
E. W. BRADFORD,
FRANK W. WOOD.